United States Patent
Yamamoto et al.

(10) Patent No.: US 8,792,595 B2
(45) Date of Patent: Jul. 29, 2014

(54) WIRELESS COMMUNICATIONS DEVICE AND METHOD

(71) Applicant: Hitachi Kokusai Electric Inc., Tokyo (JP)

(72) Inventors: Keisuke Yamamoto, Tokyo (JP); Takehiko Kobayashi, Tokyo (JP); Satoru Ejima, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 13/729,575

(22) Filed: Dec. 28, 2012

(65) Prior Publication Data

US 2013/0114749 A1 May 9, 2013

Related U.S. Application Data

(63) Continuation of application No. PCT/JP2011/068484, filed on Aug. 13, 2011.

(30) Foreign Application Priority Data

Sep. 9, 2010 (JP) ................................ 2010-202139

(51) Int. Cl.
*H04L 27/06* (2006.01)
(52) U.S. Cl.
USPC ............ 375/341; 375/262; 714/794; 714/795
(58) Field of Classification Search
None
See application file for complete search history.

(56) References Cited

U.S. PATENT DOCUMENTS

2005/0243943 A1 11/2005 Stirling-Gallacher
2009/0213965 A1* 8/2009 Maeda et al. ................. 375/341

FOREIGN PATENT DOCUMENTS

JP 2005-341560 A 12/2005
JP 2006-222872 8/2006

OTHER PUBLICATIONS

A Copy of ISR.
Reduced Complexity Space Division Multiplexing Receivers, Geert Awater et al., Lucent Technologies Bell Labs, Zadelstede 1-10, 3431 JZ Nieuwegein, The Netherlands.
Likelihood Function for Complexity-reduced Maximum Likelihood Detection Based on Symbol Replica-Candidate Selection with QR Decomposition Suitable to Soft-Decision Turbo Decoding in OFCDM MIMO Multiplexing (w/English abstract).

* cited by examiner

*Primary Examiner* — Adolf Dsouza
(74) *Attorney, Agent, or Firm* — Bacon & Thomas, PLLC

(57) ABSTRACT

A wireless communications device and method carries out a process including estimating channel information based on a received signal; generating pseudo-transmission signal point candidates based on the channel information and/or transmission signal point candidates; and generating a replica of the received signal based on the pseudo-transmission signal point candidates and the estimated channel information. The process further includes performing matrix operations on the basis of the received signal and the replica thereof; selecting pseudo-transmission signal point candidates which have a greater effect on likelihood calculations; reverting the selected pseudo-transmission signal point candidates to original transmission signal point candidates and calculating final likelihoods; and restoring the received signal on the basis of the calculated likelihoods.

13 Claims, 8 Drawing Sheets

WIRELESS COMMUNICATIONS DEVICE AND METHOD

This application is a Continuation-In-Part Application of PCT International Application No. PCT/JP2011/068484 filed on Aug. 13, 2011, which designated the United States.

FIELD OF THE INVENTION

The present invention relates to a wireless communications device and method using space division multiplexing (SDM).

BACKGROUND OF THE INVENTION

Conventionally, there is known a multiple-input multiple-output (MIMO) technology using a plurality of antennas in the field of wireless communications. Space division multiplexing (SDM) is one of the MIMO techniques to send different signals using a same wireless resource from multiple transmission antennas and to restore an original signal from signals mixed in a space by signal processing at the receiving side, thereby performing communications.

As a signal processing method at the receiving side in the SDM, there is known a spatial filtering method such as zero forcing (ZF), minimum mean square error (MMSE) and the like, or a maximum likelihood detection (MLD) method. In the spatial filtering method, the mixed signals are separated by a linear operation based on information of channels through which the signals are sent. Further, in the MLD method, candidate points for a transmission signal are retrieved based on a receiving signal and channel information and then a signal having the highest likelihood is selected among them.

More specifically, in the MLD method, the likelihood of the original transmission signal is determined by performing metric computation of a received signal and replicas of the received signal which are generated based on all of transmission signal candidate points. Thus, optimal communication characteristics can be obtained.

Since, however, the transmission signal candidate points increase exponentially depending on the number of transmission antennas used in the SDM, the amount of computation becomes enormous. Therefore, plural methods for reducing the amount of computation in the MLD method have been proposed. Mainly, the amount of computation is reduced by reducing the transmission signal candidate points used in the likelihood calculation. Non-patent Document 1 discloses a method of processing a receiving signal in the SDM.

RELATED PRIOR ARTS

[Patent Document 1] Japanese Patent Laid-open Publication No. 2006-222872

[Non-patent Document 1] Geert Awater, Allert van Zelst and Richard van Nee, "Reduced Complexity Space Division Multiplexing Receivers" in proceedings IEEE VTC 2000, Tokyo, Japan, May 11-15, 2000

SUMMARY OF THE INVENTION

However, in the above-mentioned method of processing the receiving signal, the amount of computation in a computation process cannot be sufficiently reduced.

In view of the above, the present invention provides a wireless communications device and a wireless communications method capable of easily reducing the amount of computation, the wireless communications device using a spatial multiplexing scheme.

A wireless communication device in accordance with an embodiment of the present invention includes an estimation unit which estimates channel information from on a receiving signal received through an antenna; a candidate generation unit which generates pseudo-transmission signal point candidates based on at least one of the channel information and original transmission signal point candidates; a replica generation unit which generates a receiving signal replica based on the pseudo-transmission signal point candidates and the channel information; a metric computation unit which performs metric computation based on the generated receiving signal replica and the receiving signal to select the pseudo-transmission signal point candidates having a greater effect on calculation of likelihoods; a likelihood computation unit which reverts the selected pseudo-transmission signal point candidates to the original transmission signal point candidates to calculate final likelihoods; and a restoration unit which restores the receiving signal based on the calculated likelihoods, wherein a plurality of the pseudo-transmission signal point candidates respectively represent a plurality of the transmission signal point candidates, and the number of the pseudo-transmission signal point candidates is less than that of the transmission signal point candidates.

The pseudo-transmission signal point candidates are generated and used to perform the metric computation, thereby greatly reducing the amount of metric computation.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
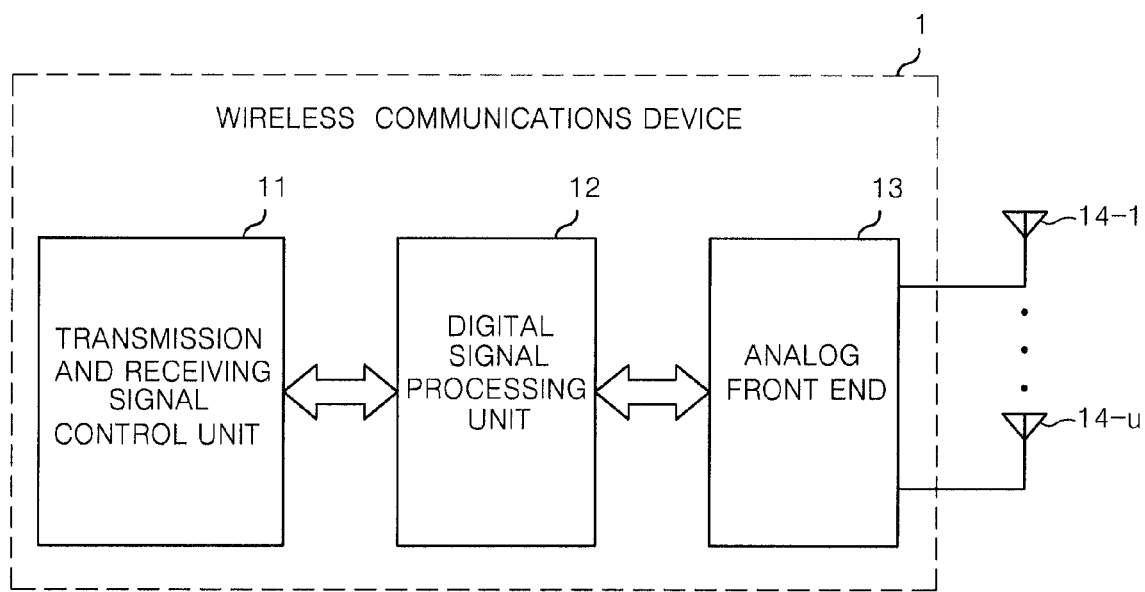
FIG. 1 is a block diagram showing an example of a configuration of a wireless communications device 1 in accordance with an embodiment of the present invention.
Figure 2:
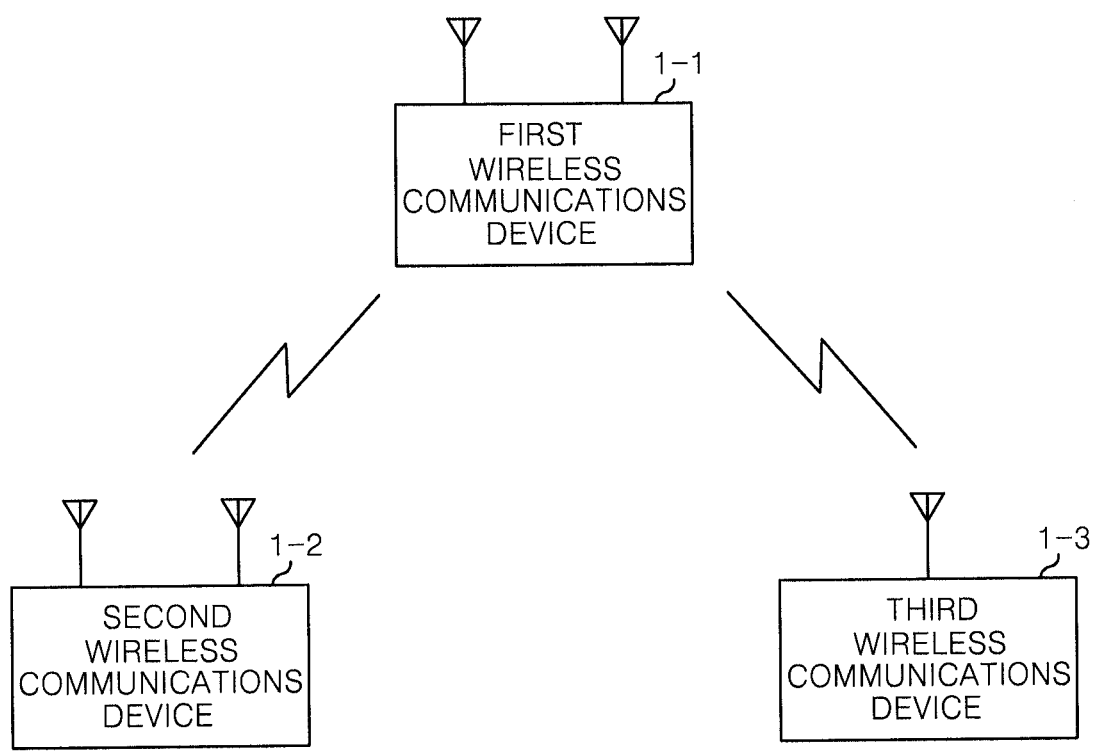
FIG. 2 is a schematic diagram showing an example of communications between wireless communications devices 1.
Figure 3:
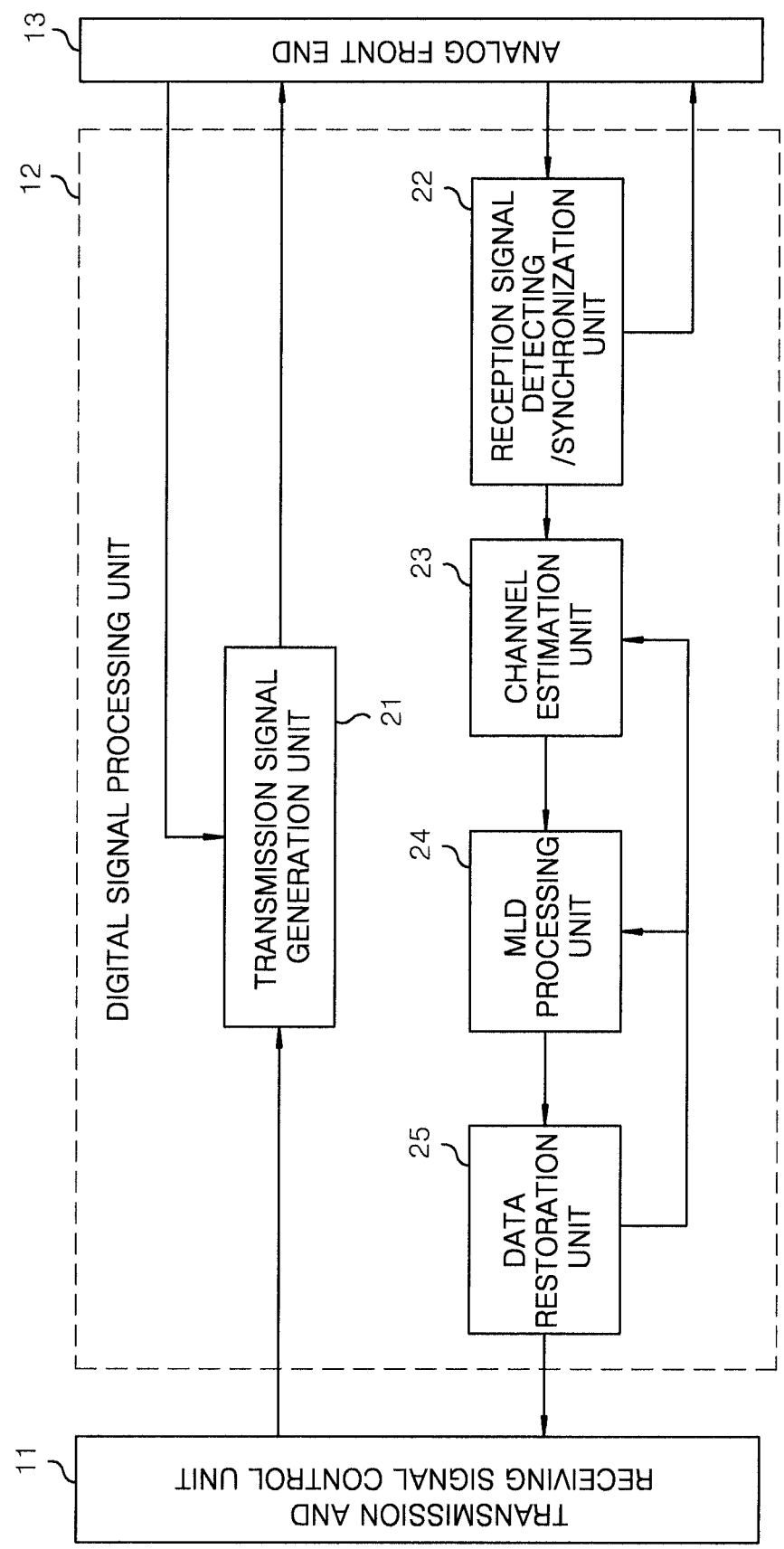
FIG. 3 is a block diagram showing an example of a configuration of a digital signal processing unit of the wireless communications device 1.
Figure 4:
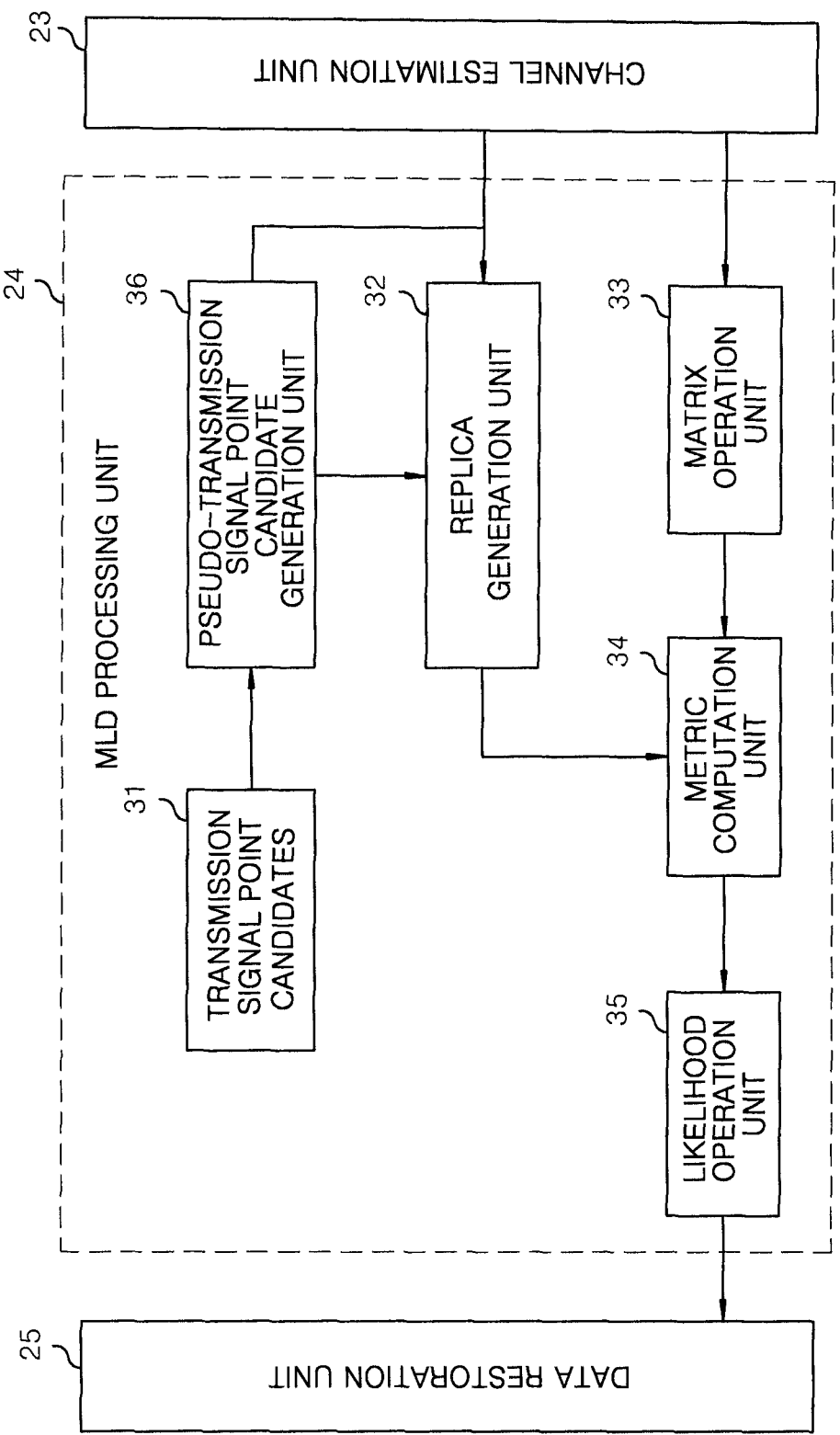
FIG. 4 is a block diagram showing an example of a configuration of a MLD processing unit of the wireless communications device 1.

Hereinafter, an embodiment of the present invention will be described in detail with reference to the accompanying drawings. FIG. 1 is a block diagram showing an example of a configuration of a wireless communications device in accordance with an embodiment of the present invention. FIG. 2 is a schematic diagram showing an example of communications between the wireless communications devices. FIG. 3 is a block diagram showing an example of a configuration of a digital signal processing unit of the wireless communications device. FIG. 4 is a block diagram showing an example of a configuration of a MLD processing unit of the wireless communications device.

Referring FIG. 1, a wireless communication device 1 in accordance with the embodiment of the present invention includes a transmission and receiving signal control unit 11, a digital signal processing unit 12 connected to the transmission and receiving signal control unit 11, and an analog front end 13 connected to a plurality of antennas 14-1 ... 14-u. Each of the wireless communications devices 1-1 and 1-2 performing transmission by using the SDM has a plurality of antennas and each of the wireless communications devices 1-1 and 1-2 receiving a transmission signal by using the SMD has at least one antenna.

Referring to FIG. 3, the digital signal processing unit 12 of the wireless communications device 1 in accordance with the embodiment of the present invention includes a transmission signal generating unit 21 and a receiving signal processing unit. The receiving signal processing unit includes: a receiving signal detection/synchronization unit 22, which receives a receiving signal from the analog front end 13; a channel estimation unit 23, which is provided at an output side of the receiving signal detection/synchronization unit 22; a maximum likelihood detection (MLD) processing unit 24, which is provided at an output side of the channel estimation unit 23; and a data restoration unit 25, which is provided at an output side of the MLD processing unit 24.

In the digital signal processing unit 12 having such a configuration, the channel estimation unit 23 receives a captured receiving signal and extracts channel information from the receiving signal. The MLD processing unit 24 calculates likelihood of the transmission signal sent from the transmitting side based on the inputted channel information and receiving data, and outputs it to the data restoration unit 25.

The data restoration unit 25 restores the receiving data based on the likelihood inputted from the MLD processing unit 24. In addition, if the MLD processing unit or the channel estimation unit 23 is configured to utilize a priori information about the data, the priori information about the transmission signal obtained by the data restoration unit 25 may be fed back to the MLD processing unit 24 or the channel estimation unit 23.

Next, a configuration of the MLD processing unit 24 will be described with reference to FIG. 4. The MLD processing unit 24 includes transmission signal point candidates 31, a pseudo-transmission signal point candidate generation unit 36, a replica generation unit 32 connected to the pseudo-transmission signal point candidate generation unit 36 and the channel estimation unit 23, a matrix operation unit 33 to which the receiving signal is supplied from the channel estimation unit 23, a metric computation unit 34 connected to the replica generation unit 32 and the matrix operation unit 33, and a likelihood computation unit 35 connected to the metric computation unit 34.

Next, the operation of the MLD processing unit 24 will be described. The replica generation unit 32 generates a receiving signal replica based on the channel information and transmission signal point candidates. The matrix operation unit 33 performs a conversion on a receiving signal vector y in order to reduce the amount of computation. There is known QR-MLD in which a Hermitian transposed matrix of a unitary matrix is used as the conversion, the unitary matrix being obtained by performing QR-decomposition on the channel information. Further, the replica generation unit 32 performs the same conversion on the inputted transmission signal point candidates.

If the number of transmission antennas is $N_{tx}$ and the number of receiving antennas is $N_{rx}$ ($N_{tx}$ and $N_{rx}$ are natural numbers and at least one of $N_{tx}$ and $N_{rx}$ is two or more), the receiving signal vector y, a transmission signal candidate vector s, a channel matrix H, and a receiving signal replica r are expressed by Eq. 1:

$$y = \begin{bmatrix} y_1 \\ y_2 \\ \vdots \\ y_{N_{rx}} \end{bmatrix}$$

$$s = \begin{bmatrix} s_1 \\ s_2 \\ \vdots \\ s_{N_{tx}} \end{bmatrix}$$

$$H = \begin{bmatrix} h_{11}, & h_{12}, & \ldots, & h_{1N_{tx}} \\ \vdots & \ddots & & \vdots \\ \vdots & & \ddots & \vdots \\ \vdots & & & \ddots & \vdots \\ h_{N_{rx}1}, & h_{N_{rx}2}, & \ldots, & h_{N_{rx}N_{tx}} \end{bmatrix}$$

$$r = \begin{bmatrix} r_1 \\ r_2 \\ \vdots \\ r_{N_{rx}} \end{bmatrix} = H \cdot s.$$

Eq. 1

The metric computation unit 34 performs metric computation based on a norm determined from the receiving signal y and the replica r from the replica generation unit 32. If there is a feedback from the data restoration unit 25, the feedback is used as the priori information in the metric computation.

The MLD processing unit 24 outputs a general log likelihood ratio (LLR) as bit likelihood information. The LLR is expressed by Eq. 2:

$$L(b_i) = \log \left[ \frac{\sum_{r_k | r_k(b_i)=0} \exp\left(-\frac{\|y - r_k\|}{2\sigma^2}\right)}{\sum_{r_k | r_k(b_i)=1} \exp\left(-\frac{\|y - r_k\|}{2\sigma^2}\right)} \right],$$

Eq. 2 where $b_i$ represents the i-th bit, $\sigma^2$ represents the variance of the noise, and the denominator and numerator in the log represent the likelihoods (bit likelihoods) of all replicas (i.e., all of the transmission signal point candidates) in case of $b_i=1$ and $b_i=0$, respectively. In Eq. 2, the norm $\|y-r_k\|$ becomes the Euclidian norm (2-norm) in the strict operation, but it may be approximated by using the Manhattan norm (1-norm), the maximum norm ($\infty$-norm), or a combination thereof in order to reduce the amount of computation.

In order to obtain the complete bit likelihood from Eq. 2, it is necessary to compute all receiving signal replicas r and the norm. If the number of modulation signal points of the transmission signal is M (M is an integer equal to or greater than 2), the number of receiving signal replicas for all signal point candidates is $N_{tx}$ power of M. If M and/or $N_{rx}$ is large, the amount of metric computation becomes enormous.

Therefore, to reduce the amount of computation in the MLD, the metric computation is performed only for the transmission signal point candidates having a greater effect on the likelihood calculation. For example, it has been known that the Max-Log-Map algorithm, in which the bit likelihood for each bit in Eq. 2 is calculated only for the smallest norm in cases of each bit $b_i=0$ and 1, is a good approximation of the strict bit likelihood. In this case, ideally, the metric computation can be performed only for two types of transmission signal point candidates, i.e., bi=0, 1 for each bit. In other words, the amount of computation in the MLD can be significantly reduced if the number of the transmission signal point candidates having a greater effect on the bit likelihood calculation can be reduced by a small amount of computation.

As a feature of the present embodiment, the MLD processing unit 24 includes the pseudo-transmission signal point candidate generation unit 36 to generate pseudo-transmission signal point candidates, and generates replicas for the pseudo-transmission signal point candidates to perform metric calculation thereon. The pseudo-transmission signal point candidates generated in the pseudo-transmission signal point candidate generation unit 36 are signal point candidates which are representative of a plurality of signal point candidates and which are generated based on channel information and the original transmission signal point candidates. As a result, it is possible to reduce the amount of computation by using the pseudo-transmission signal point candidates when narrowing down the transmission signal point candidates.

Figure 5:
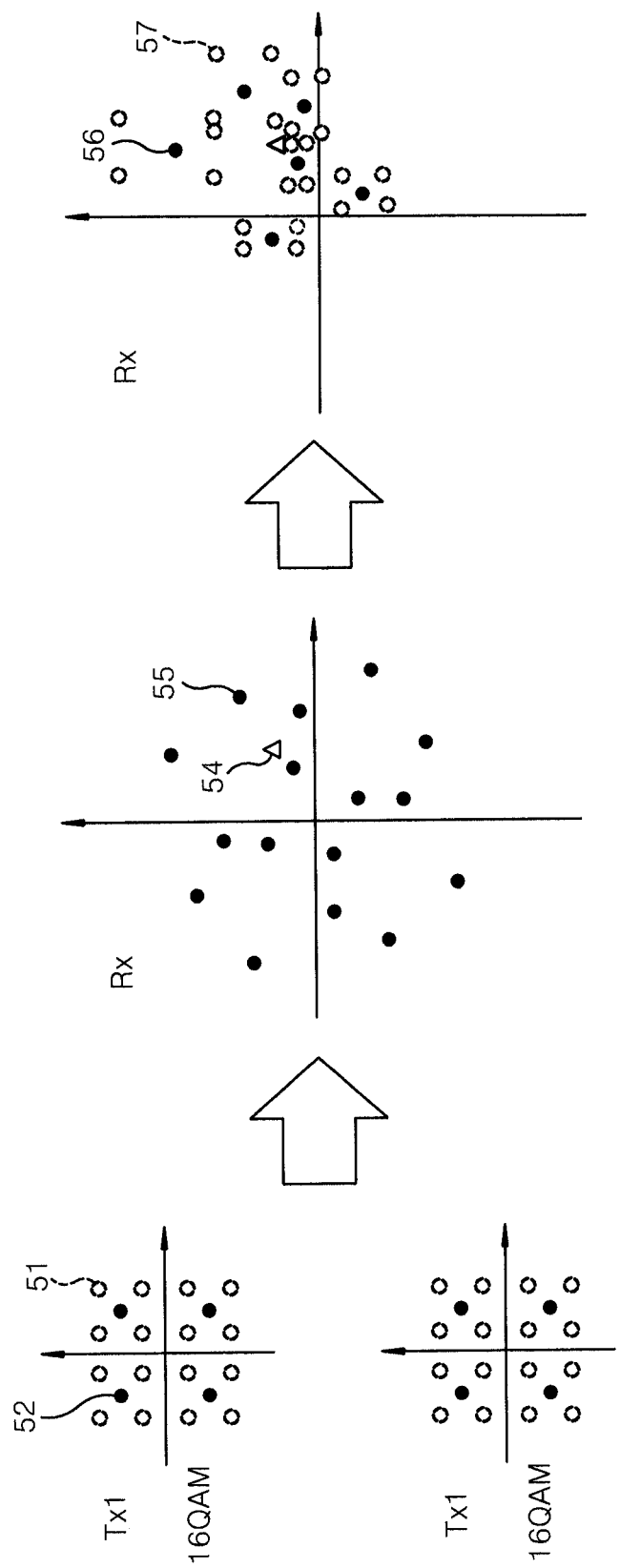
FIG. 5 is an explanatory diagram showing an example of a metric computation method of the MLD processing unit of the wireless communications device 1.

FIG. 5 is an explanatory diagram showing an example of a metric computation method of the MLD processing unit 24. FIG. 5 shows a metric computation method in the MLD processing unit 24 in the case where 16 QAM of digital modulation scheme is used as the modulation scheme of the transmission signal in which 16 signal points are arranged in an orthogonal grid on the complex plane, and $N_{rx}=2$. The left side of FIG. 5 shows an arrangement of the signal points of the original transmission signal. The original transmission signal point candidates 51 include 16 points for each transmission antenna (i.e., M=16).

Pseudo-transmission signal point candidates 52 are generated by the pseudo-transmission signal point candidate generation unit 36 based on the signal point arrangement of the original transmission signal. The number $M_s$ ($M_s$ is an integer equal to or greater than 2 and less than M) of the pseudo-transmission signal point candidates 52 is 4 in this example. The positions of the pseudo-transmission signal point candidates 52 may be basically fixed if the original signal point arrangement is determined. For example, The positions are distributed as uniformly as possible on a signal point arrangement diagram.

Preferably, the pseudo-transmission signal point candidates 52 are respectively positioned at the centers of the groups of the original transmission signal point candidates (before being represented). In this example, for four transmission signal point candidates 51 in each quadrant of the signal point arrangement, one pseudo-transmission signal point candidate 52 is generated at the center of the four transmission signal point candidates 51. All the positions of pseudo-transmission signal point candidates 52 are set to be different from those of the original transmission signal point candidates 51 of a general modulation scheme (signal point arrangement).

For such pseudo-transmission signal point candidates 52, receiving signal replicas 55 at the receiving side is $M_s^2=16$ points in total. The metric computation of the receiving signal replicas 55 and the receiving signal 54 is performed, and the transmission signal point candidates 56 which are supposed to have a greater effect on the final likelihood calculation are left (extracted). After the left pseudo-transmission signal point candidates are reverted to a plurality of original transmission signal point candidates 57, the bit likelihood is calculated by applying the Max-Log-Map (i.e., from the transmission signal point candidate having a minimum norm among the reverted original transmission signal point candidates), thereby obtaining the LLR.

As a result of narrowing down the signal point candidates, there may occur a situation for a particular bit $b_i$ where no transmission signal point candidates exist for $b_i=0$ or $b_i=1$. In this case, since the likelihood of $b_i=0$ or 1 of the particular bit is lost and the LLR cannot be calculated from Eq. 2, an approximate likelihood is allocated. The approximate likelihood is calculated from the bit likelihoods for the other bits $b_j$ ($j \neq i$) that remain. For example, a method of allocating the smallest bit likelihood (which corresponding to the largest norm) among bit likelihoods for $b_j$ to the lost bit likelihood is used.

Further, in selecting the transmission signal point candidates having a greater effect on the final likelihood calculation, a method of selecting $N_m$ transmission signal point candidates ($N_m$ is an integer equal to or greater than 2) in order from one having the smallest norm is used. In this case, in order to prevent the loss of the bit likelihood as much as possible, the signal point candidates may be left in preference such that at least one signal point candidate having the bit opposite to that of the transmission signal point candidate having the smallest norm is left for each bit, in addition to simply considering the magnitude of the norm.

The example in which the pseudo-transmission signal point candidates are generated from the signal point arrangement of the transmission signal is shown in FIG. 5. However, it is also possible to reduce the amount of computation by generating the pseudo-transmission signal point candidates each representing a plurality of neighboring signal point candidates in case of using the receiving signal replica generated based on the pseudo-transmission signal point candidates using the channel information. Although the case of using 16 QAM has been illustrated in FIG. 5, the present invention can be applied to a multilevel modulation scheme other than the QAM and the pseudo-transmission signal point candidates can be generated in the same manner.

The example where the number of the transmission signal point candidates per antenna is 16 has been illustrated in FIG. 5. However, if the number of modulation levels is greater than that, the generation of the pseudo-transmission signal point candidates and/or the narrowing of the signal point candidates may be carried out in several stages.

Figure 6:
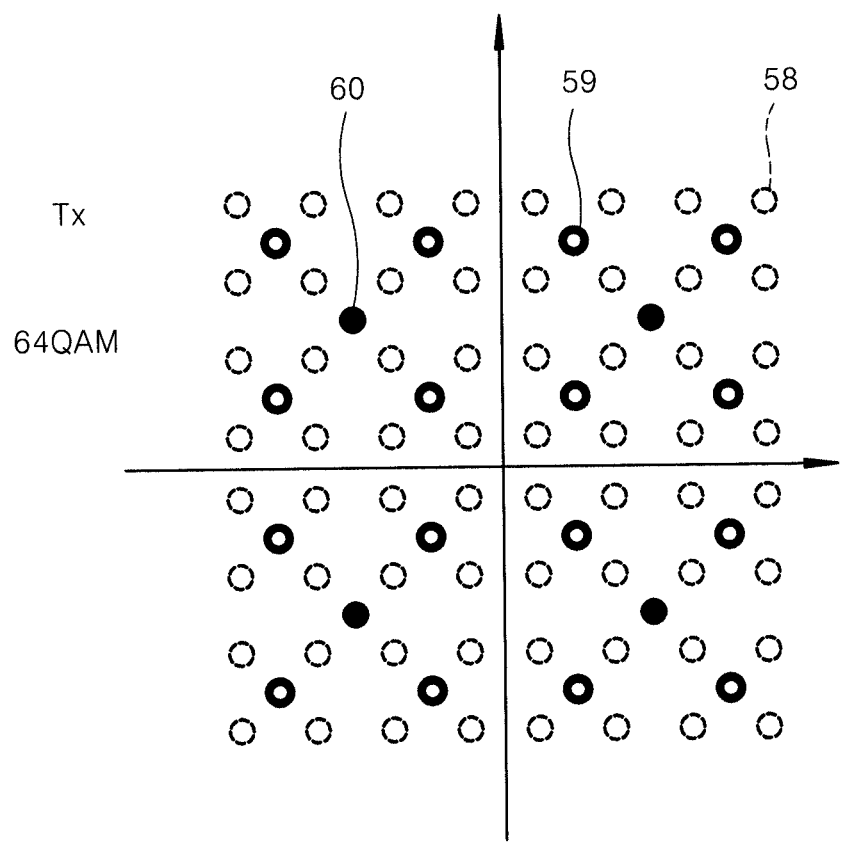
FIG. 6 is an explanatory diagram showing an example of a method of generating pseudo-transmission signal point candidates when the MLD processing unit of the wireless communications device 1 uses 64 QAM.

FIG. 6 shows an example of a method of generating the pseudo-transmission signal point candidates based on the signal point arrangement diagram when using 64 QAM. If the narrowing of the transmission signal point candidates is completed by one stage as in FIG. 5, 64 points of the original signal 58 is narrowed down to 16 points of the signal 59 or 4 points of the signal 60, which are representative of the original signal 58. Then, after reverting it to the original multiple transmission signal point candidates, thereby completing the final metric computation.

In the case of performing the narrowing in two stages, 4 points of the signal 60 are regarded as pseudo-transmission signal point candidates further representing 16 points of the pseudo-transmission signal point candidates 59. Accordingly, after the signal point candidates are narrowed by using 4 points of the pseudo-transmission signal point candidates in the first stage, each of the narrowed signal point candidates is reverted to 16 pseudo-transmission signal point candidates. Then, the narrowing of the second stage is performed, and finally, each of the secondly narrowed signal point candidates is reverted to the original transmission signal point candidates of 64 points, thereby performing the metric computation. As a result, by using the pseudo-transmission signal point candidates, it is possible to significantly reduce the amount of computation in a metric computation process.

Figure 7:
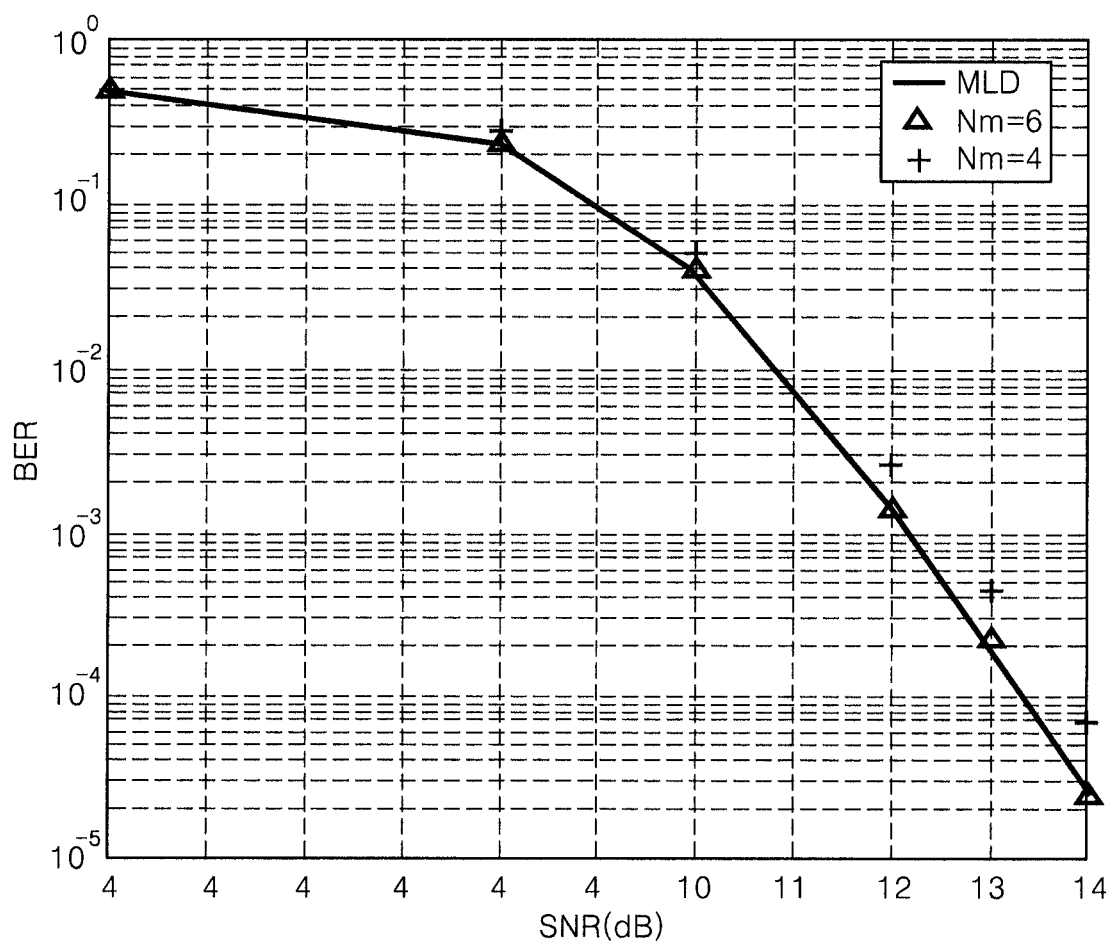
FIG. 7 is a graph showing simulation results of BER characteristics of the MLD of the wireless communications device 1.

FIG. 7 shows simulation results of BER characteristics of the MLD in which the amount of computation is reduced according to the present embodiment. FIG. 7 illustrates a case for 2×2 MIMO-MLD when the number $N_{tx}$ of transmission antennas is 2, the number N, of receiving antennas is 2, the number M of modulation signal points is 16, and a convolutional code having a constraint length K of 7 and a coding rate of ½ is used as an error correction code (ECC). Referring FIG. 7, "MLD" of a solid line represents a case where the amount of computation is reduced only by Max-Log-Map (prior art), and $N_m$=6 or $N_m$=4 represents a case where the number $N_m$ of transmission signal point candidate selections is 6 or 4 (present embodiment).

In the simulation of the MLD according to the present embodiment, the pseudo-transmission signal point candidates of 4 points is generated for the transmission signal point candidates of 16 points, and then the metric computation of the receiving signal and the receiving signal replicas generated by using the pseudo-transmission signal point candidates is performed. After narrowing down to $N_m$ pseudo-transmission signal point candidates, each of the $N_m$ candidates is reverted to four original signal point candidates, and final bit likelihoods were calculated. It can be confirmed that there is little degradation of the BER if $N_m$=6.

Example 1

Figure 8:
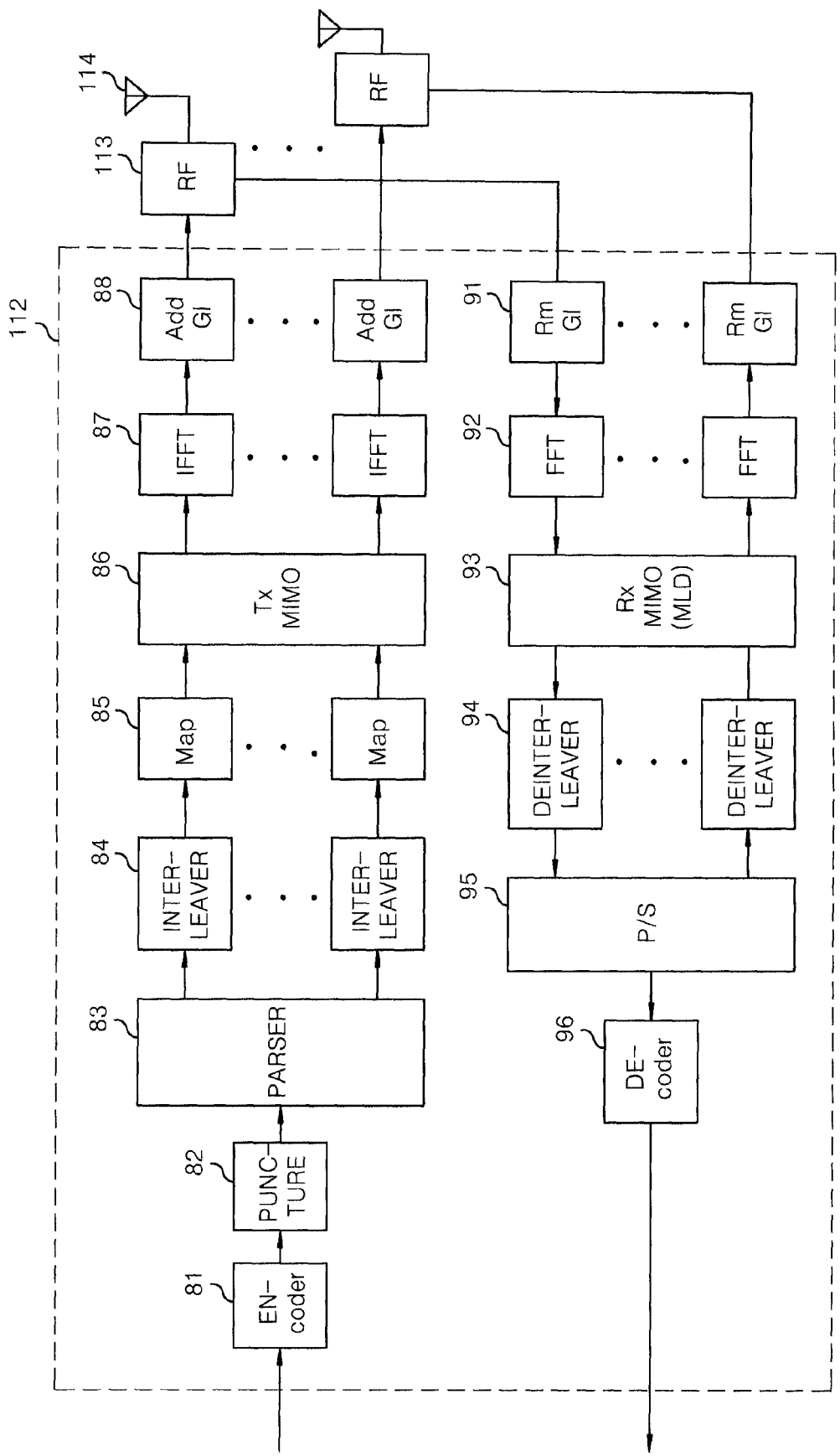
FIG. 8 is a block diagram of a wireless communications device 100 in accordance with a first example.

FIG. 8 is a block diagram of a wireless communications device 100 in accordance with an example 1. The wireless communications device 100 shown in FIG. 8 is a MIMO-OFDM communications device which performs communications using the SDM. Reference numerals 112, 113 and 114 correspond to the digital signal processing unit 12, the analog front end 13 and the antenna 14 in the wireless communication device 1 of the above embodiment. Since the transmission and receiving signal control unit 11 is similar to that of the wireless communication device 1, an illustration thereof is omitted.

At the transmission side, an encoder 81 receives a transmission signal from the transmission and receiving signal control unit 11, and encodes it. A puncture 82 generates a codeword having a desired coding rate. The generated codeword is divided into each stream of SDM by a parser 83. Then, the divided codeword is interleaved by an interleaver 84, preliminarily modulated by a mapper 85, and processed by a transmission MIMO processing unit 86. After that, the codeword is OFDM modulated by an IFFT 87 and a guard interval (GI) adder 88, and then is transmitted from an antenna 114 through an analog front end (RF) 113.

At the receiving side, a receiving signal is received through the analog front end 113 from each antenna, subjected to synchronization capture and GI removal by a GI remover 91, OFDM-demodulated by an FFT 92 and then processed by a receiving MIMO processing unit 93. The receiving MIMO processing unit 93 corresponds to the channel estimation unit 23 and the MLD processing unit 24 of FIG. 3.

The signal processed by the receiving MIMO processing unit is de-interleaved by a de-interleaver 94, merged into one stream by a merger (P/S) 95, and then sent to an error correction decoder 96. The error correction decoder 96 corresponds to the data restoration unit 25 of FIG. 3. In the case where the result of the error correction is fed back to the receiving MIMO processing unit 93, external information of bit likelihoods obtained after the error correction is interleaved in an opposite manner of the de-interleaver 94, and then sent to the receiving MIMO processing unit 93 (not shown).

The present invention can be readily applied to a wireless communications device which receives a combined signal from multiple paths having different channel characteristics, a signal received from at least one path being a multilevel modulation signal greater than the value of 4, and performs maximum likelihood decoding using an approximation such as the Max-Log, maximum posterior probability decoding, iterative decoding or the like.

What is claimed is:

1. A wireless communication device comprising:
   a plurality of receiving antennas;
   an estimation unit configured to estimate information of a multiplicity of channels based on receiving signals received through the receiving antennas, the number of the channels being a product of the number of transmission antennas of a transmitting side transmitting transmission signals and the number of the receiving antennas;
   a candidate generation unit configured to generate, before performing a metric computation, pseudo-transmission signal point candidates based on an arrangement of plural transmission signal point candidates, each of the pseudo-transmission signal point candidates being representative of a part of the plural transmission signal point candidates and positions of the pseudo-transmission signal point candidates being different from those of the plural transmission signal point candidates;
   a replica generation unit configured to generate receiving signal replicas for each of the receiving antennas based on the pseudo-transmission signal point candidates and the information of the channels;
   a metric computation unit configured to perform the metric computation based on the generated receiving signal replicas and the receiving signals to select a part of the pseudo-transmission signal point candidates having a greater effect on calculation of likelihoods;
   a likelihood computation unit configured to revert each of the selected pseudo-transmission signal point candidates to a corresponding part of the transmission signal point candidates to calculate final likelihoods; and
   a restoration unit configured to restore the transmission signals based on the calculated likelihoods.

2. The wireless communication device of claim 1, wherein the positions of the pseudo-transmission signal point candidates are distributed uniformly on a signal point arrangement diagram.

3. The wireless communication device of claim 1, wherein the selected pseudo-transmission signal point candidates include a pseudo-transmission signal point candidate having a smallest norm for a particular bit of the transmission signals when a value of the particular bit is 0 and a pseudo-transmission signal point candidate having a smallest norm for the particular bit when a value of the particular bit is 1.

4. The wireless communication device of claim 1, wherein when none of the selected pseudo-transmission signal point candidates exists for a particular bit of the transmission signals having a value of 0 or 1, the likelihood computation unit is configured to obtain a likelihood for the particular bit from a likelihood of another bit.

5. The wireless communication device of claim 1, wherein the number of the selected pseudo-transmission signal point candidates is equal to or greater than 2, and wherein transmission signal point candidates reverted from the selected pseudo-transmission signal point candidates include a transmission signal point candidate for a particular bit of the transmission signals when a value of the particular bit is 0 and a transmission signal point candidate for the particular bit when a value of the particular bit is 1.

6. The wireless communication device of claim 1, wherein each of the pseudo-transmission signal point candidates is representative of neighboring transmission signal point candidates.

7. The wireless communication device of claim 1, wherein the candidate generation unit is configured to generate intermediate transmission signal point candidates each of which being representative of multiple transmission signal point candidates, and wherein each of the pseudo-transmission signal point candidates is representative of a part of the intermediate transmission signal point candidates.

8. A wireless communication method comprising:

estimating information of a multiplicity of channels based on receiving signals received through a plurality of receiving antennas, the number of the channels being a product of the number of transmission antennas of a transmitting side transmitting transmission signals and the number of the receiving antennas;

generating, before performing a metric computation, pseudo-transmission signal point candidates based on an arrangement of plural transmission signal point candidates, each of the pseudo-transmission signal point candidates being representative of a part of transmission signal point candidates and positions of the pseudo-transmission signal point candidates being different from those of the plural transmission signal point candidates;

generating receiving signal replicas for each of the receiving antennas based on the pseudo-transmission signal point candidates and the information of the channels;

performing the metric computation based on the generated receiving signal replicas and the receiving signals to select a part of the pseudo-transmission signal point candidates having a greater effect on calculation of likelihoods;

reverting each of the selected pseudo-transmission signal point candidates to a corresponding part of transmission signal point candidates to calculate final likelihoods; and restoring the transmission signals based on the calculated likelihoods.

9. The wireless communication method of claim 8, wherein the positions of the pseudo-transmission signal point candidates are distributed uniformly on a signal point arrangement diagram.

10. The wireless communication method of claim 8, wherein the selected pseudo-transmission signal point candidates include a pseudo-transmission signal point candidate having a smallest norm for a particular bit of the transmission signals when a value of the particular bit is 0 and a pseudo-transmission signal point candidate having a smallest norm for the particular bit when a value of the particular bit is 1.

11. The wireless communication method of claim 8, further comprising:

when none of the selected pseudo-transmission signal point candidates exists for a particular bit of the transmission signals having a value of 0 or 1, obtaining a likelihood for the particular bit from a likelihood of another bit.

12. The wireless communication method of claim 8, wherein the number of the selected pseudo-transmission signal point candidates is equal to or greater than 2, and wherein transmission signal point candidates reverted from the selected pseudo-transmission signal point candidates include a transmission signal point candidate for a particular bit of the transmission signals when a value of the particular bit is 0 and a transmission signal point candidate for the particular bit when a value of the particular bit is 1.

13. The wireless communication method of claim 3, wherein each of the pseudo-transmission signal point candidates is representative of neighboring transmission signal point candidates.

* * * * *